Nov. 19, 1929. W. C. MEYER 1,736,272
SEAM PRESSING MACHINE
Filed Sept. 26, 1924 2 Sheets-Sheet 2
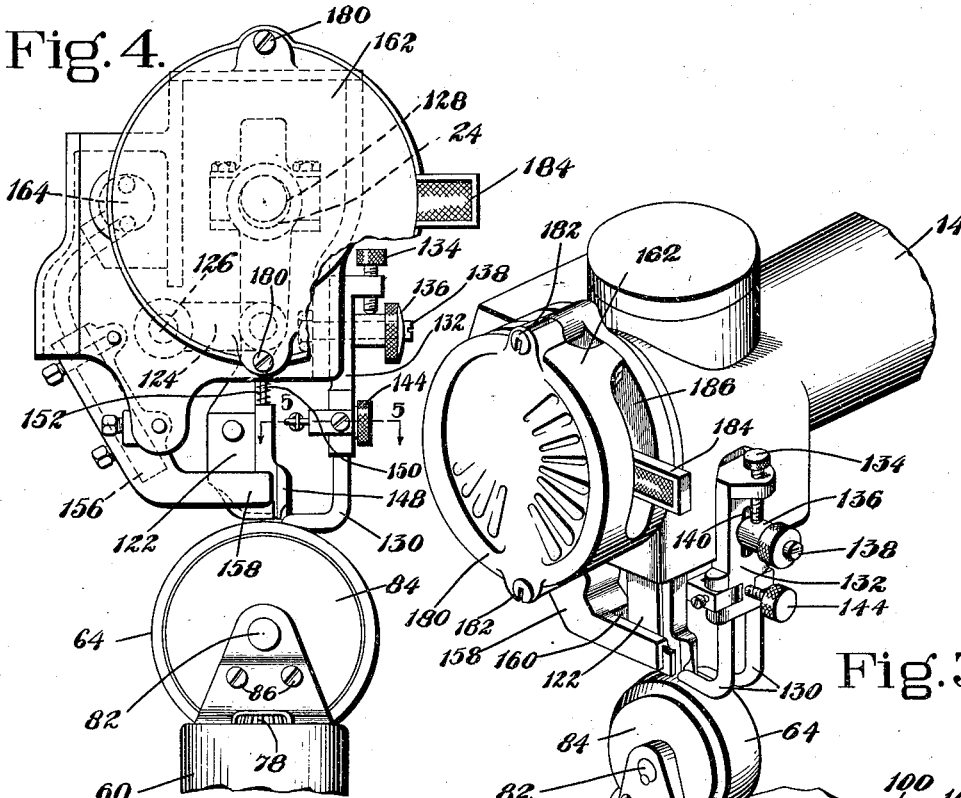
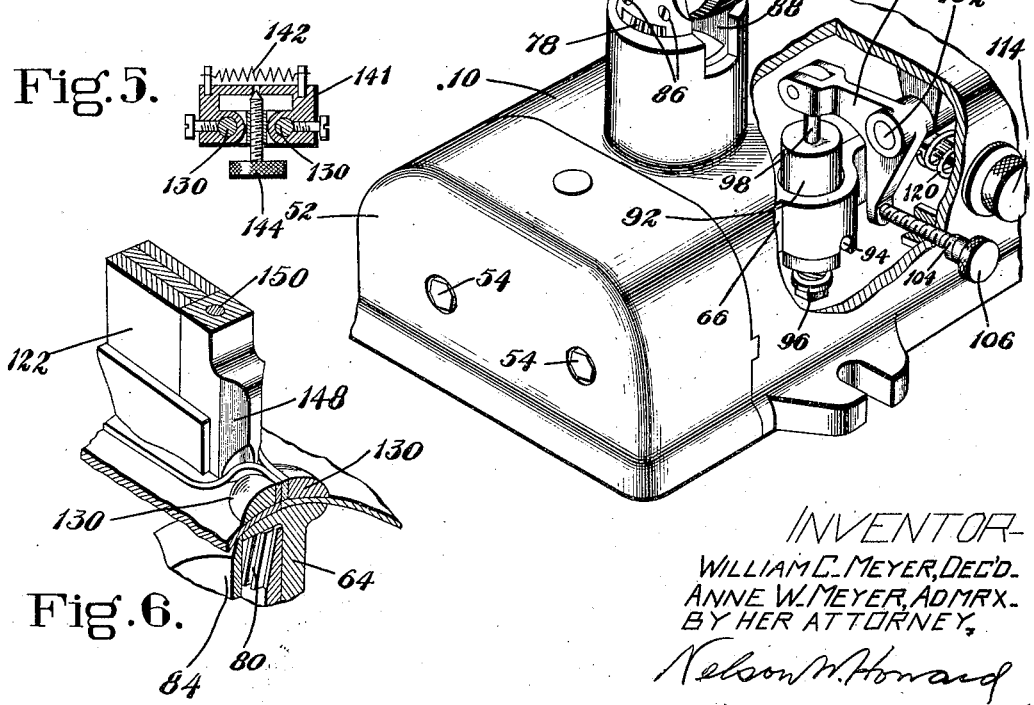
INVENTOR
WILLIAM C. MEYER, DEC'D.
ANNE W. MEYER, ADMRX.
BY HER ATTORNEY,
Nelson W. Howard Patented Nov. 19, 1929

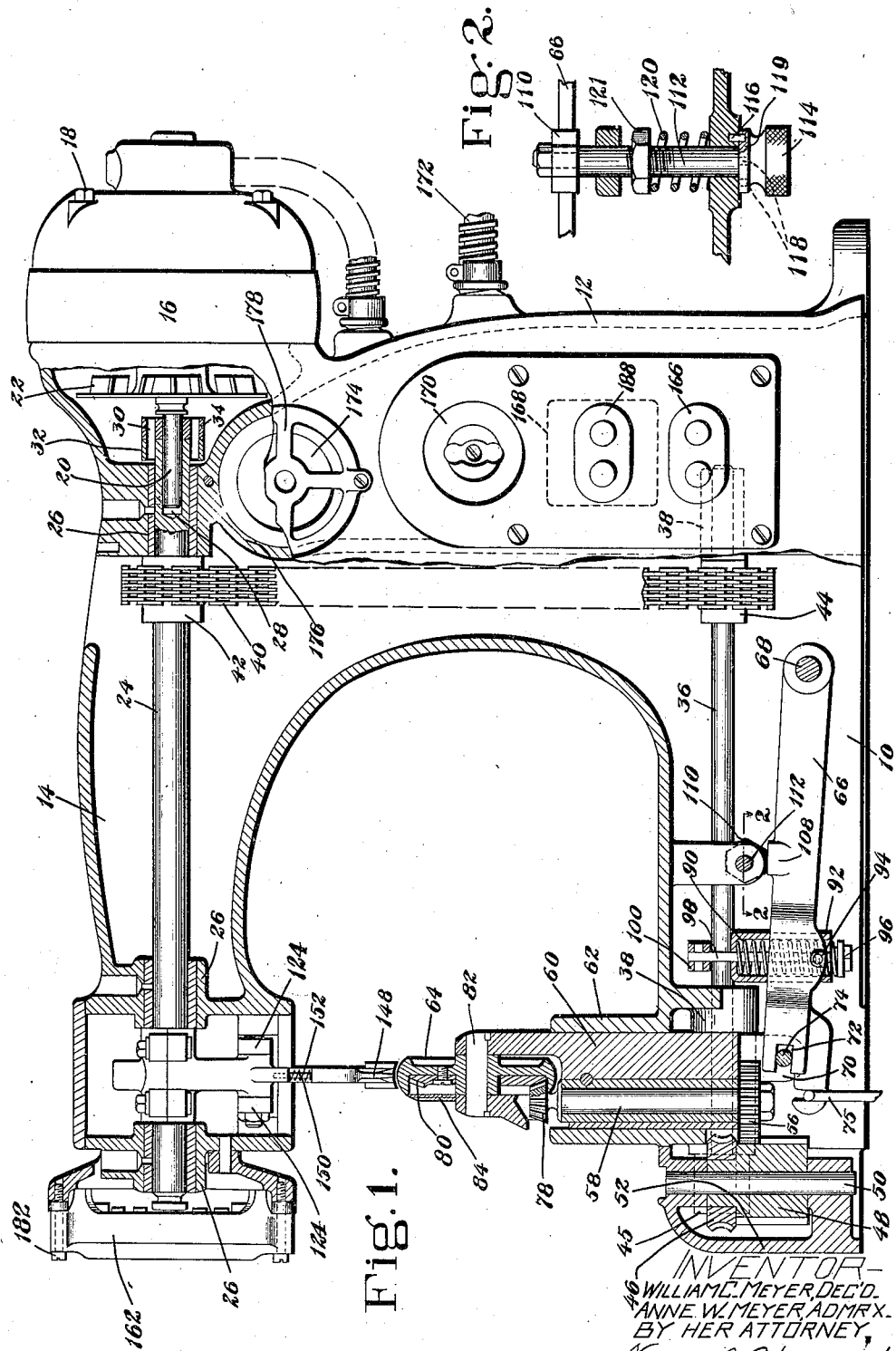

1,736,272

UNITED STATES PATENT OFFICE

WILLIAM C. MEYER, DECEASED, LATE OF BEVERLY, MASSACHUSETTS, BY ANNE W. MEYER, ADMINISTRATRIX, OF BEVERLY, MASSACHUSETTS, ASSIGNOR TO UNITED SHOE MACHINERY CORPORATION, OF PATERSON, NEW JERSEY, A CORPORATION OF NEW JERSEY

SEAM-PRESSING MACHINE

Application filed September 26, 1924. Serial No. 740,099.

This invention relates to machines for performing finishing operations upon boot or shoe parts. As herein illustrated, the invention is embodied in an upper seam pressing machine of the general type described in United States Letters Patent No. 1,570,057, granted January 19, 1926, and No. 1,701,845, granted February 12, 1929, both in the name of F. M. Furber.

An object of the present invention is to reorganize and simplify the construction of machines of the above type to obtain still greater efficiency of operation and to enable such a machine to operate with less vibration and to continue to operate for more extended periods without disadvantageous wear and without being liable to get out of order.

With the above and other objects in view, as will hereinafter appear, the present invention comprises various improvements in the construction and relative arrangement of parts in machines of the general type referred to. As herein illustrated, these improvements include the provision, in a machine having seam pressing means and a rotary work support, of parallel shafts connected to be driven one from the other and respectively connected to operate the seam pressing means and to rotate the work support, and an electric motor directly connected with one of said shafts. The parallel arrangement of the shafts enables them to be driven one from the other by means of a sprocket chain and, as shown, a chain of the silent drive type is employed for the purpose of reducing noise and vibration to a minimum. The parallel shafts are shown as arranged one above the other, the upper shaft carrying an eccentric for operating the seam pressing means and being directly connected with the motor, while the lower shaft is connected with the rotary work support by means including a pair of relatively slidable intermeshing gears arranged to permit vertical adjustment of the work support without interfering with the driving connections between the work support and the lower shaft. It is particularly advantageous to have the upper shaft directly connected with the motor, as described, inasmuch as the upper shaft drives the seam pressing means and consequently encounters more resistance and requires to be driven at greater speed than the lower shaft.

The mechanism of the illustrated machine, with the exception of the parts which engage the work, is enclosed within and protected by means of a frame comprising a hollow base, upon which is mounted the rotary work support, and a hollow standard rising from the base and having a portion overhanging the work support and carrying the seam pressing means. The upper and lower shafts are disposed, respectively, in the overhanging portion of the standard and in the base, while the chain connecting these shafts is conveniently located within the upright portion of the standard. The work support and the seam pressing means are advantageously arranged relatively to the frame so that they co-operate to feed the work in a direction at right angles to the overhanging portion of the frame standard, and by reason of this arrangement and direction of feed, the work may be guided and manipulated with the greatest convenience while it is being fed and the advance of the work will be entirely unobstructed irrespective of the length of the seam.

The above and other characteristics of the invention will be hereinafter set forth in detail and particularly defined in the appended claims.

Referring now to the accompanying drawings,

Fig. 1 is a view partially in vertical section and partially in front elevation of a machine constructed in accordance with the present invention;

Fig. 2 is a detail sectional view taken on the line 2—2 of Fig. 1;

Fig. 3 is a perspective view of one end of the machine, a section of the frame or casing being broken away to disclose parts of the operating mechanism;

Fig. 4 is an end elevational view of a portion of the machine;

Fig. 5 is a detail sectional view taken on the line 5—5 of Fig. 4; and

Fig. 6 is a detail perspective view showing portions of the operating instrumentalities and illustrating their mode of operation upon a piece of work.

The mechanism of the illustrated machine, with the exception of the instrumentalities which operate upon the work, is enclosed within a casing comprising a substantially rectangular hollow base 10 upon which is mounted a rotary work support, and a hollow standard or gooseneck 12 rising from one end of the base and formed with an overhanging upper portion 14 which supports the seam pressing instrumentalities. An electric motor is confined within a housing 16 at one end of the upper portion 14 of the standard, the housing 16 having an inner portion integral with the main casing and an outer portion detachably secured to the inner portion by means such as the screws 18. The armature shaft 20 of the motor has secured thereto a rotary fan 22 and is directly connected with a main driving shaft 24 which is located within and extends lengthwise of the overhanging upper portion 14 of the standard and is journaled in bearings 26 therein. The housing 16 is suitably ventilated to enable the fan 22 to produce circulation of air for the purpose of cooling the motor. One end of the armature shaft 20 is journaled in a suitable bearing carried by the outer portion of the housing 16 while the inner end of said shaft is received within an axial socket 28 formed in the adjacent end of the main driving shaft. One of the bearings 26 is arranged to support the shaft 24 at its socketed end, thus also providing a support for the inner end of the armature shaft which projects into the socket 28, telescoping with the shaft 24, so as to insure against undue vibration of the armature shaft such as might occur if it should be supported entirely by an overhung portion of the shaft 24. In addition to the bearing just referred to there are two other bearings 26 which are spaced apart at the forward end portion of the shaft 24 to provide vibrationless support for means, hereinafter described, which actuates the seam pressing instrumentality. The motor is positively connected with the driving shaft 24 by means of a plurality of driving pins 30 carried by a disk-like head 32 integral with the driving shaft 24 and slidably received in suitable apertures formed in a disk 34 fixed to the armature shaft. This directly connected telescoping arrangement of the two shafts 20 and 24 insures accurate axial alinement of the shafts and positive driving connections therebetween irrespective of slight inaccuracies in the machining of the adjacent parts of the motor housing. Inasmuch as one of the bearings 26 surrounds the telescoping ends of the motor and driving shafts, accurate alinement of these shafts and smooth running of the high speed driving shaft is insured. As a result of this construction, also, the adjacent ends of the driving and armature shafts are supported by a single bearing only. The described manner of coupling the shafts 20 and 24 enables the shafts to be uncoupled without the use of tools in order to permit the removal of the motor and without the necessity of disturbing the driving connections between the shaft 24 and the operating instrumentalities of the machine.

A horizontal shaft 36, disposed in parallel relation to the driving shaft 24, is journaled in bearings 38 within the hollow base 10 and is driven from the shaft 24 by means of a silent chain 40 passing over sprocket wheels 42 and 44 of the same diameter on the shafts 24 and 36, respectively, the arrangement being such that the chain 40 is located entirely within the hollow base 10 and the upright portion of the standard 12. At the opposite extremity of the shaft 36 from the sprocket wheel 44 is located a worm 45, and this worm drives a worm wheel 46 which is fast on the hub of a spur gear 48. The gear 48 is mounted to turn freely upon a vertical rod 50 rigidly secured at its opposite ends in bosses formed within a detachable end portion 52 of the hollow base 10 and arranged to prevent axial displacement of said worm wheel and gear. The detachable portion 52 is secured to the base 10 by means of screws 54 (Fig. 3) which, as shown, are countersunk to prevent them from interfering with the work. By removing the screws 54, the end portion 52 may be removed, together with the worm wheel 44 and the gear 48, to afford convenient access to the adjacent parts of the mechanism. The gear 48 is made of unusual width, and meshing therewith is a relatively narrow gear 56 which is fast upon the lower end of a vertical shaft 58. The shaft 58 is journaled in a suitable bushing rigidly secured within a cylindrical slide 60 and the slide 60 is movable vertically within a guiding sleeve 62 which projects upwardly from the base 10, and the slide carries a rotary work-supporting roll 64. The slide 60 is normally held yieldingly in an upper position by means of a spring-pressed lever 66 which is pivoted upon a horizontal rod 68 carried by the base 10 and which extends between the depending ears 70 of the slide 60, the end of the lever 66 being notched at 72 to receive a pin 74 carried by said ears. The slide 60 may be depressed by pulling downwardly on the lever 66 by means of a suitable treadle (not shown) and a treadle rod 75. The above-described connections between the cylindrical slide 60 and the lever 66 serve to prevent the slide from turning within its guiding sleeve 62. The width of the gear 48 is such that the gear 56 remains in mesh therewith as the latter gear and the slide 60 move up and down relatively to the gear 48. The use of the relatively slidable intermeshing gears 48 and 56 reduces to a minimum the frictional resistance to the vertical movements of the work support.

The rotary work-supporting roll 64 is constantly driven from the shaft 58 by means of a bevel pinion 78 located in a protecting cavity or recess in the slide 60 and meshing with a bevel gear 80 rigidly secured to one side of the roll 64. As shown, the roll 64 is located between upwardly extending ears on the slide 60 and is mounted to turn about a fixed axle 82 carried by said ears. A disk 84 secured by screws 86 to the slide 60 serves as a shield to prevent the material operated upon from coming into contact with the gear 80. The guiding sleeve 62 is notched at 88, as shown in Fig. 3, to receive the roll 64 as the slide 60 is depressed.

The rotary work support 64 is pressed upwardly by means of a spring 90 contained within a tubular housing 92 which is swiveled at 94 within a socket in the lever 66. The spring 90 is adapted to be compressed between the closed upper end of the housing 92 and a collar nut 96 threaded upon the lower end of a rod 98 which extends through the coils of the spring and through the closed upper end of the housing 92, the rod 98 being pivoted to the horizontal arm of a bell-crank lever 100. The lever 100 is pivoted at 102 to a lug depending from the upper wall of the hollow base 10 and the vertical arm of the lever is engaged by an adjusting screw 104 threaded through the front wall of the base 10 and provided, exteriorly of the base, with a knurled head 106 by which it may conveniently be turned to adjust the tension of the spring 90.

The upward movement of the work support 64 is limited by engagement of an abutment 108 upon the lever 66 with an adjustable stop member 110 fixedly secured upon a stud 112. The stop member 110 is made in the form of a collar having a six-sided periphery, the several sides or faces of which are located at different distances from the stud 112, so that by turning the stud the different stop faces may selectively be brought into position to engage with the abutment 108 to vary the upper position of the lever and consequently of the work support 64. The stud 112 extends outwardly through the front wall of the base 10 and is adapted to be turned to vary the setting of the stop faces by means of a knurled head 114 at its outer extremity. Provision is made to insure against accidental turning of the stop member 110 while the lever 66 is depressed to permit insertion or removal of the work. This means comprises a retaining pin 116 projecting forwardly from the front wall of the base 10 and adapted to engage with any one of a plurality of apertures 118 formed in a peripheral flange 119 carried by the knurled head 114. A spring 120 which encircles the stud 112, between the front wall of the casing and a nut 121 carried by the stud, normally insures interengagement of the pin 116 with one of the apertures 118. The head 114 may be pulled forwardly to disengage it from the pin 116 to enable the stop member to be readjusted. The several apertures 118 may be appropriately marked to indicate the different thicknesses of work which the various settings of the work support are designed to accommodate.

Co-operating with the rotary work support to feed the work is a feed hammer 122 which is pivotally mounted between the arms of a yoke 124 arranged to rock about a rod 126 carried by the overhanging portion 14 of the frame. The feed hammer is moved through an orbital path by means of an eccentric 128 (Fig. 4) upon the main driving shaft 24 which is located between the two forward bearings 26, and which is received in a socket in the upper extremity of the feed hammer. This movement of the hammer causes it to deliver a rapid succession of blows against the work.

The seam is guided into the machine by means of members 130 (Figs. 3 and 4) having inwardly bent lower portions for engaging opposite sides of the seam and vertical upper portions mounted in bearings in a slide 132 which can be adjusted vertically by a screw 134 and clamped in adjusted position by a binding nut 136. As shown, the nut 136 is threaded upon a bolt 138 which extends through a vertically elongated slot 140 in the slide 132 and the screw 134 is arranged to abut against the side of the nut 136. Arms 141 (Fig. 5) carried by the upper portions of the members 130 are connected by a spring 142 tending to twist the lower ends of the members 130 into guiding engagement with the seam. An adjustable stop screw 144 is provided with a conical inner end arranged to spread apart the arms 141, or to permit them to approach each other so as to effect relative adjustment of the lower guiding ends of the members 130.

The seam is opened by means of a plow member 148 seated on a forwardly projecting portion of the feed hammer 122 and guided by a pin 150 which passes through the plow and is secured at its opposite ends to the hammer, the plow member being yieldingly urged downwardly toward its seat by a spring 152.

The construction and mode of operation of the feed hammer 122, the seam opening plow 148 and the seam guiding members 130, the cross-sectional shape of the work-supporting roll 64 and the relative speed at which the hammer and the roll are driven, as illustrated, are substantially the same as set forth in detail in the above-mentioned Patent No. 1,701,-845, and consequently need not be further described herein. In the machine illustrated, however, the rotary work support and the feed hammer, which co-operates with the work support to feed the work, are so arranged relatively to the frame of the machine that the work will be advanced in a direction at right angles to the overhanging portion of the standard 12. With this arrangement the standard will not obstruct the path of feed of the work, and various switches mounted within the standard, as will hereinafter appear, are rendered accessible from the front of the machine.

The feed hammer 122 is heated by an electric unit 156 mounted within a stationary member 158 which is slotted at 160 to embrace the work engaging portion of the hammer 122. The heating unit 156 is connected through a rheostat 162 and a connection block 164 with a heat controlling switch 166, and the latter may, as shown, be connected through a suitable fuse block, or cut-out 168, and main line switch 170 with electric terminal wires entering the casing at 172. A pilot light 174 may be connected with the heat controlling switch 168 in parallel with the wires of the heating circuit and contained, as shown in Fig. 1, within a compartment 176 which is formed within the casing and opens toward the front of the machine, the pilot light being protected from breakage by a skeleton shield 178. The rheostat 162, as illustrated, is made in the form of a unit attached to the outer end of the overhanging portion 14 of the casing. The contacts on the rheostat are enclosed within a perforated cover plate 180 and removably secured in place by means of screws 182, and the contact lever or operating handle 184 projects through a slot 186 in the side of the cover plate, the ends of the slot limiting the extent of movement of said lever. It will be noticed that while the lever or operating handle of the rheostat is located at the front of the machine conveniently near the point of operation of the seam pressing instrumentalities upon the work, the position of said handle is such that it is incapable of obstructing the feed or interfering with the free manipulation of the work. Inasmuch as the rheostat is located somewhat above the plane of the work, the setting of the rheostat is unlikely to be accidentally shifted during the operation of the machine. A suitable switch 188, located above the heat controlling switch 166, is connected in any usual or convenient manner with the motor. All the switches, as well as the connection block 164 and the fuse block 168, are entirely enclosed within and protected by the hollow standard 12, and the operating handles of the switches project through the wall of the standard 12 at the front of the machine where they are conveniently accessible to the operator. By the provision of separate switches controlling the heat and power, the operator is enabled to turn on the heat before starting the machine so that the seam pressing instrumentalities may be heated to the desired temperature when operation upon the work begins.

The machine, as above described, is of extremely simple construction and is well adapted to operate in a highly efficient manner upon the work. On account of the described arrangement of the driving shaft and the motor, and the construction of the transmission mechanism, the machine is capable of operating at high speed and substantially without vibration and noise. The character of the motion imparted to the operating parts is such that the machine may be depended upon to operate over a long period without appreciable wear and without need of repairs. All parts except those which engage the work being enclosed within the casing, the work is thus protected from oil and the mechanism is protected from lint and dust. Furthermore, the various devices for effecting adjustment of the operating parts, as well as the switches and other means for controlling the supply of electric current, while readily accessible to the operator, are so located as not to interfere in any way with the feeding or manipulation of the work.

Having thus described the invention, what is claimed as new and desired to be secured by Letters Patent of the United States is:—

1. In a motor driven seam pressing machine, seam pressing means, a rotary work support, parallel shafts respectively connected to operate the seam pressing means and to rotate the work support, an electric motor having an armature shaft directly connected in telescoping relation with one of said shafts, a fixed bearing surrounding the telescoping portions of the last mentioned shaft and the armature shaft, and driving connections between said parallel shafts.

2. In a motor driven seam pressing machine, a frame, seam pressing means carried by the upper portion of the frame, a rotary work support mounted in the lower portion of the frame, upper and lower parallel shafts respectively connected to operate said pressing means and to rotate said support, said upper shaft having an axial socket at one end, an electric motor carried by the frame, a third shaft bearing the armature of the motor and having one end directly connected to drive said upper shaft and projecting into the socket in the latter shaft, driving connections between said parallel shafts, and a bearing on said frame for the socketed end of said upper shaft.

3. In a motor driven seam pressing machine, seam pressing means, a rotary work support, shafts respectively operating said means and said support, driving connections between said shafts, a motor shaft telescoping within and supported at one end only by one of said shafts, and a bearing for the other end of the motor shaft.

4. In a motor driven seam pressing machine, a driving shaft, an electric motor having an armature shaft coaxially alined with the driving shaft, means for supporting one end of the armature shaft and directly connecting it with one end of the driving shaft, a bearing for the driving shaft adjacent to its connection with the armature shaft, an eccentric on the opposite end portion of the driving shaft, seam pressing means connected to be actuated from said eccentric and spaced bearings for the driving shaft arranged closely adjacent to each side of the eccentric.

5. In a motor driven seam pressing machine, a driving shaft, an electric motor having an armature shaft coaxially alined with the driving shaft, means for supporting one end of the armature shaft and directly connecting it with one end of the driving shaft, a bearing for the driving shaft adjacent to its connection with the armature shaft, an eccentric on the opposite end portion of the driving shaft, seam pressing means connected to be actuated from said eccentric, spaced bearings for the driving shaft arranged adjacent to each side of the eccentric, a work supporting roller arranged to co-operate with the seam pressing means, a third shaft operatively connected with the roller, and means for connecting said third shaft with the driving shaft at a point between the first mentioned bearing and the other bearings.

6. In a motor driven seam pressing machine, seam pressing means, a rotary work support, parallel shafts respectively operating said means and said support, a motor shaft coaxial with one of said shafts, a motor having its rotor secured upon the motor shaft and directly connected with one of said parallel shafts, the other of said parallel shafts being driven from the shaft bearing said rotor, and a casing enclosing said shafts and said motor and having a portion separable from the rest of the casing to permit disconnection of the motor shaft from the shaft operating the seam pressing means by axial movement of the motor shaft, the separable portion of the casing being arranged to support one end only of the motor shaft.

7. In a seam pressing machine, a driving shaft having an axial socket at one end thereof, seam pressing devices actuated therefrom, an electric motor having an armature shaft axially alined with said shaft and adapted to project into said socket, a plurality of pins projecting beyond one end of the driving shaft and parallel to the axis of said shaft, a member rotatable with the armature shaft of the motor and provided with holes arranged to receive said pins to couple said driving shaft to the armature shaft, and a bearing for said driving shaft surrounding the socketed portion of the latter.

8. In a seam pressing machine, a frame comprising a hollow base and a hollow standard rising from and overhanging the base, a horizontal driving shaft contained within the overhanging portion of the standard, seam pressing means carried by said overhanging portion and actuated from said shaft, a second shaft contained within the hollow base and arranged in parallel relation to the first shaft, rotary work supporting means driven from the second shaft, a silent chain connecting said shafts and enclosed within the upright portion of the standard, an electric motor having an armature shaft journaled at one end only, and direct driving connections between said driving shaft and the armature shaft constructed and arranged to support the opposite end of the armature shaft.

9. In a seam pressing machine, a work supporting roller, a vertically movable slide carrying said roller, a vertical shaft journaled in said slide and having its upper end geared to said roller, a gear fixed to the lower end of said shaft, a driving shaft extending at right angles to the direction of movement of the slide, a worm on the driving shaft, driving connections between said worm and said gear constructed and arranged to permit movement of the slide relatively to the driving shaft, and a mounting for said driving connections, said mounting and said driving connections being detachable from the rest of the machine as a unit.

10. In a seam pressing machine, a rotary work support, a vertically movable slide carrying the work support, means for raising and lowering the slide, a vertical shaft journaled in the slide and slidable therewith, driving connections between the shaft and the work support, a driven gear fixed to the shaft, a horizontal driving shaft, a hollow frame enclosing said gear and the slide operating means and having a detachable portion, an axially immovable driving gear carried by said detachable frame portion and meshing with said driven gear, said driving gear being constructed and arranged to remain in mesh with said driven gear irrespective of the vertical position of the slide, and detachable driving connections between said gear and said horizontal driving shaft.

11. In a seam pressing machine, a rotary work support, a vertically movable slide carrying the work support, means for raising and lowering the slide, a driving worm, a worm wheel driven thereby, a spur gear compounded with the worm wheel, a vertical shaft journaled in the slide, a second spur gear secured upon said vertical shaft in intermeshing sliding engagement with the first spur gear, reduction gearing between the vertical shaft and the work support, and a frame enclosing said driving connections and comprising a detachable frame member supporting said worm wheel and said spur gear.

12. In a seam pressing machine, a rotary work support, yielding means to maintain said support in an upper position, means for depressing the support to permit withdrawal of work thereover, and an adjustable stop member having a plurality of stop faces capable of being selectively positioned to limit in different degrees the upward movement of said support.

13. In a seam rubbing machine, a rotary work support, yielding means to maintain said support in an upper position, a device to depress the support to permit withdrawal of work thereover and a rotatably adjustable stop member having a plurality of peripheral faces located at different distances from the rotational axis of said member and capable of being selectively positioned by rotation of said member to limit in different degrees the upward movement of the work support.

14. In a seam rubbing machine, a rotary work support, yielding means to maintain said support in an upper position, means including a lever for depressing the work support to permit withdrawal of work thereover, a rotary and axially slidable shaft, a member carried by said shaft having a plurality of peripheral stop faces located in the path of said lever and at different distances from the shaft, and means for turning said member to bring a selected stop face into operative position.

15. In a seam rubbing machine, a hollow casing, a rotary work support mounted exteriorly of said casing, means within the casing including a lever for depressing the support to permit withdrawal of work thereover, a rotatable and axially slidable shaft projecting through the wall of the casing, a member having a plurality of peripheral stop faces located at different distances from the axis of said shaft and in the path of said lever, means outside of the casing for turning said shaft to position a different stop face in the path of said lever, and means for holding said shaft in adjusted position.

16. In a seam rubbing machine, a rotary work support, yielding means to maintain said support in an upper position, means including a lever for depressing the work support to permit withdrawal of work thereover, a rotary and axially slidable shaft, a stop member carried by said shaft having a plurality of peripheral stop faces located in the path of said lever and at different distances from the shaft, means for turning said member to bring a selected stop face into operative position, and yielding means for retaining the adjustment of the stop member.

17. In a seam rubbing machine, a hollow casing, a rotary work support mounted exteriorly of said casing, means within the casing including a lever for depressing the support to permit withdrawal of work thereover, a rotatable and axially slidable shaft projecting through the wall of the casing, a member having a plurality of peripheral stop faces located at different distances from the axis of said shaft, and a head carried by said shaft outside of the casing for turning the shaft to position a selected stop face in the path of said lever, said head and said casing being provided one with a locating pin and the other with a plurality of apertures for receiving said pin arranged selectively to locate the several stop faces in operative position.

18. In a seam rubbing machine, a hollow casing, a rotary work support mounted exteriorly of said casing, means within the casing including a lever for depressing the support to permit withdrawal of work thereover, a rotatable and axially slidable shaft projecting through the wall of the casing, a member having a plurality of peripheral stop faces located at different distances from the axis of said shaft, a head carried by said shaft outside of the casing for turning the shaft to position a selected stop face in the path of said lever, said head and said casing being provided one with a locating pin and the other with a plurality of apertures for receiving said pin arranged selectively to locate the several stop faces in operative position, and a spring urging said shaft in a direction to maintain interlocking engagement of said pin with one of said apertures.

19. In an electrically driven seam pressing machine, a frame comprising a hollow base having a hollow standard rising therefrom and terminating in a horizontally extending hollow arm portion overlying said base, a driving shaft enclosed within the hollow standard, a driven seam supporting feed roll mounted on said base, a driven seam pressing member carried by said arm portion of the frame and driven by said shaft, electrical means for heating said pressing member, an electric motor entirely housed within a portion of the frame, means within the hollow frame for directly connecting the shaft of the motor with said driving shaft, driving connections contained within the hollow frame for driving the pressing member and the feed roll from the motor, separate switches mounted within the standard for controlling the motor and the heating means and having operating handles projecting through the wall of the standard, a pilot light connected with the heat controlling switch, a compartment within the hollow standard opening at the front of the machine in which the pilot light is located, a skeleton shield at the open side of said compartment for protecting the exposed side of the pilot light, and a rheostat for the heating means secured to the free extremity of said arm portion of the frame.

In testimony whereof, I have signed my name to this specification.

ANNE W. MEYER,
*Administratrix of the Estate of William C. Meyer, deceased.*